May 2, 1967
H. DIETZ ETAL
3,317,835
HALL GENERATOR WATTMETER HAVING SQUARE WAVE SUPERIMPOSED ON HALL PLATE OUTPUT TO COMPENSATE FOR POWER FACTOR
Filed May 8, 1964
3 Sheets-Sheet 1
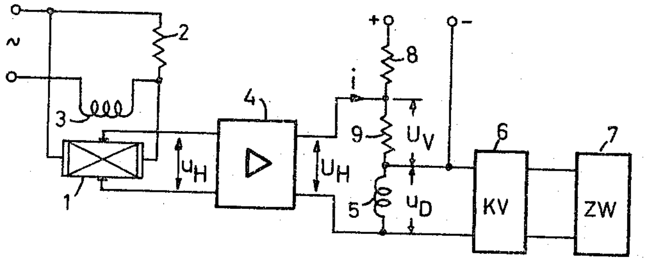
Fig. 1
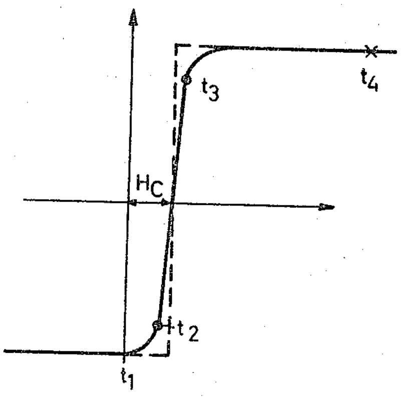
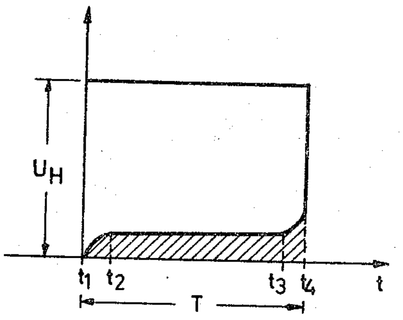
Fig. 2b
Fig. 2a
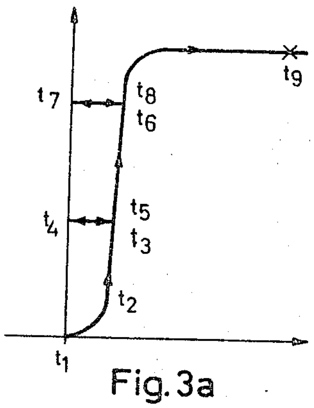
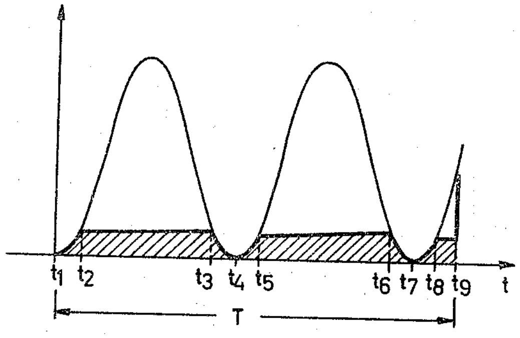
Fig. 3a
Fig. 3b May 2, 1967 H. DIETZ ETAL 3,317,835

HALL GENERATOR WATTMETER HAVING SQUARE WAVE SUPERIMPOSED ON HALL PLATE OUTPUT TO COMPENSATE FOR POWER FACTOR

Filed May 8, 1964 3 Sheets-Sheet 2

May 2, 1967

H. DIETZ ETAL 3,317,835

HALL GENERATOR WATTMETER HAVING SQUARE WAVE SUPERIMPOSED ON HALL PLATE OUTPUT TO COMPENSATE FOR POWER FACTOR

Filed May 8, 1964

3 Sheets-Sheet 3

United States Patent Office 3,317,835

Patented May 2, 1967

3,317,835

HALL GENERATOR WATTMETER HAVING SQUARE-WAVE SUPERIMPOSED ON HALL PLATE OUTPUT TO COMPENSATE FOR POWER FACTOR

Helmut Dietz, Ottokar Halla, and Erich Rainer, all of Nurnberg, Germany, assignors to Siemens-Schuckert-werke Aktiengesellschaft, Berlin-Siemensstadt, Germany, a corporation of Germany Filed May 8, 1964, Ser. No. 366,040

Claims priority, application Germany, May 10, 1963, S 85,148

3 Claims. (Cl. 324—117)

Our invention relates to electronic alternating current systems for performing wattmetric measurements with the aid of a Hall generator and has for its object to improve the metering accuracy of such systems particularly when the load factor departs from the unity value.

Figure 4:
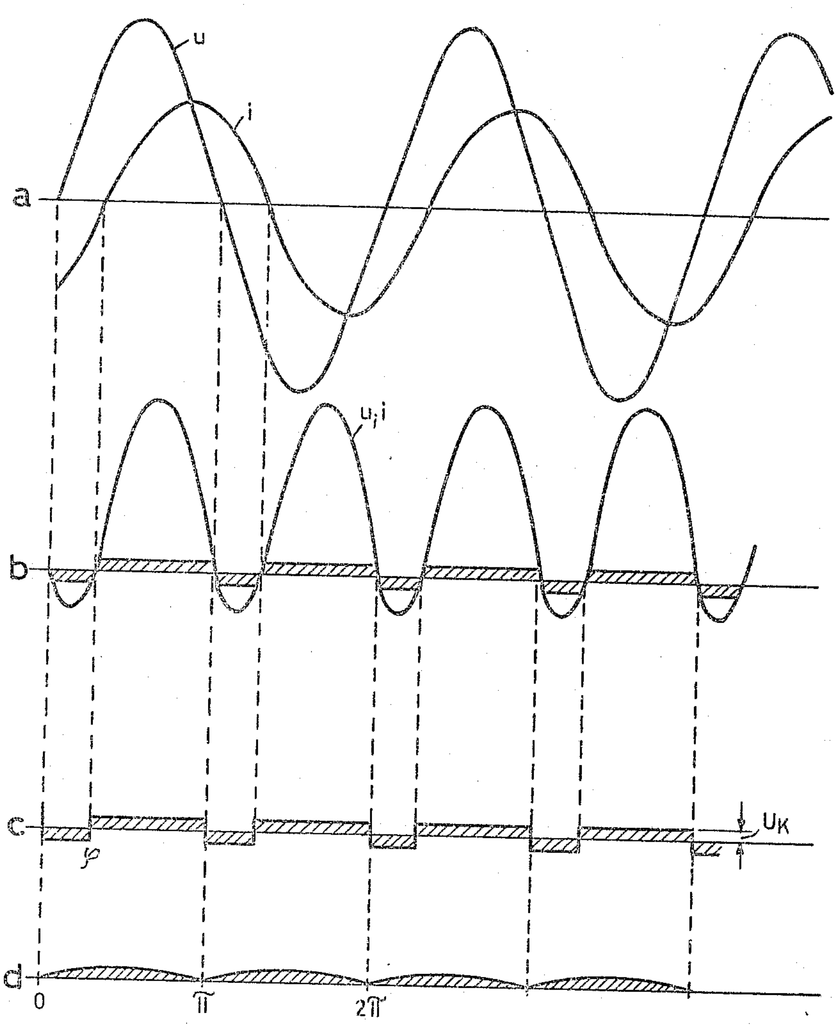
Figure 5:
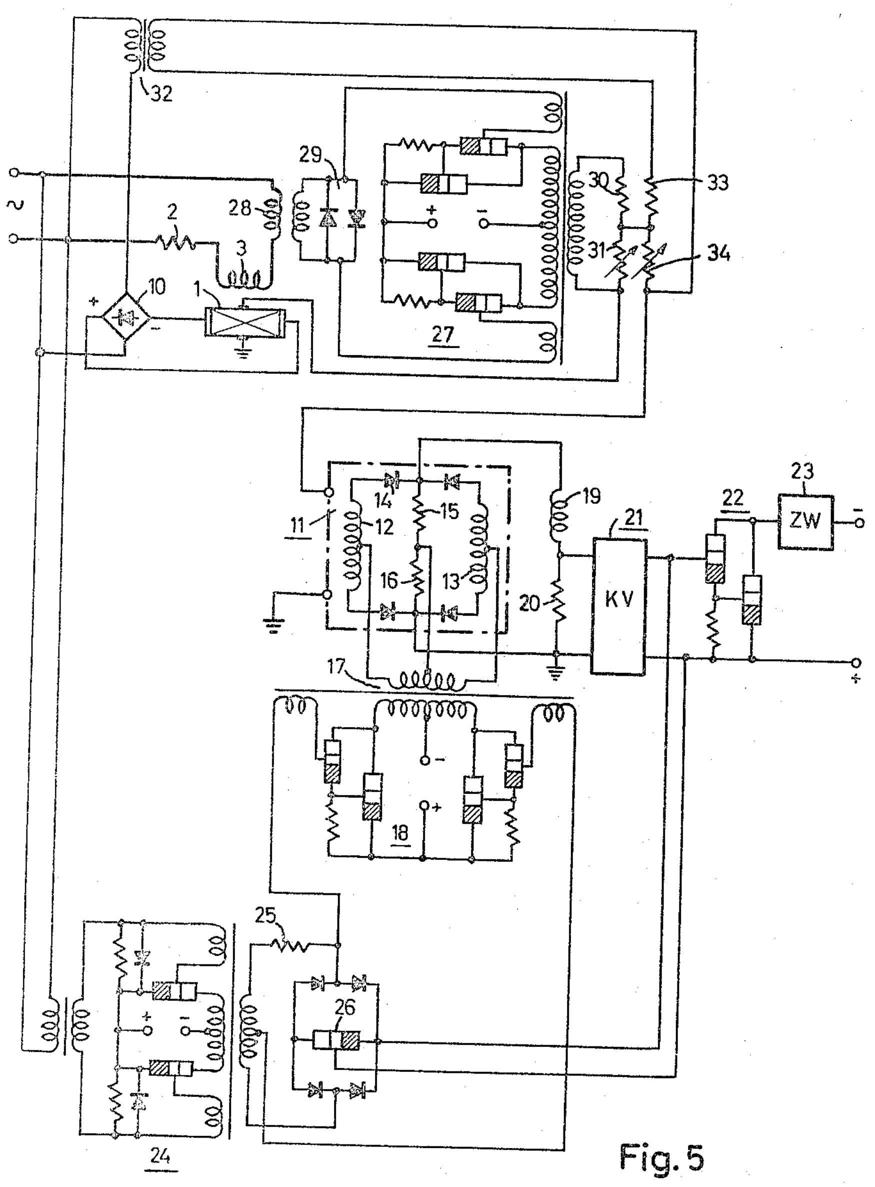

The invention will be described with reference to the accompanying drawings, in which:

FIG. 1 is an explanatory circuit diagram relating to a prior system;

FIGS. 2*a* and 2*b* and FIGS. 3*a* and 3*b* and FIG. 4 are explanatory graphs; and FIG. 5 is a circuit diagram of a power metering system embodying the invention by way of example.

In a more particular aspect our invention relates to an electronic power metering system for alternating current in which the active power value is measured with the aid of a Hall generator which receives one of its two input magnitudes in rectified condition so as to operate as a modulator. The Hall voltage is amplified, demodulated and supplied to an integrating device whose output controls a mechanical or other counter. Metering systems of this type are disclosed in the copending application of E. Ranier Ser. No. 320,332, filed Oct. 31, 1963, and assigned to the assignee of the present invention.

If the above-mentioned integrating device performs the integration by means of a saturable reactor coil whose induction is proportional to the integral of the applied voltage, then the moment at which saturation of the reactor occurs can be utilized for triggering the counter, this being also described in the above-mentioned copending application. However, if exacting accuracy requirements must be met, a disturbing and no longer negligible error is encountered. This will be explained presently.

For simplicity, assume that the Hall voltage to be integrated is a direct voltage. According to the law of induction, the following equation applies to those periods of time T during which the reactor core is subjected to reversal in magnetization by a constant voltage $U_H$:

$$\int_0^T U_H dt = U_H \cdot T = w \cdot q_F \cdot \Delta B$$

The counting frequency $f$, namely the number of forward steps performed by the counter per second, results from the equation $$f = \frac{l}{T}\,\frac{U_H}{w \cdot q_F \cdot \Delta B} \sim U_H$$

It can be deduced from FIGS. 1 and 2 that this proportionality is not exactly preserved because of the ohmic resistance in the reactor circuit and on account of the hysteresis of the reactor-core material.

FIG. 1 shows schematically an electronic alternating current metering system of the above-described type, comprising a Hall generator 1 whose magnetic field is excited by means of an excitation winding 3 connected in the circuit of a load 2. The current passing through the excitation winding 3 thus constitutes a first input magnitude of the Hall generator. The control current passing lengthwise through the Hall generator constituting the second input magnitude, is proportional to the voltage impressed upon the load 2. The resulting output voltage $u_H$, tagen from across the two Hall electrodes of the generator is supplied to an amplifier 4. The direct current component of the Hall voltage corresponds to the active power. The alternating voltage component of the Hall voltage can be filtered out, and the direct voltage component can be smoothed. In this manner a direct voltage $U_H$ is obtained, and the latter voltage is applied to an integrating reactor 5. Each time the reactor 5 becomes saturated, a flip-flop amplifier 6 is triggered and switches a counting mechanism 7 one step forward.

The integrating current $i$ passes through an ohmic resistance R in the integrating circuit. This resistance is composed of the winding resistance of the integrating reactor 5 and of additional resistances which depend upon the amplifier and appertaining circuit components. Essentially involved is the output resistance of the amplifier 4. Under these conditions, the integration is in accordance with the relation $$\frac{U}{H} = R \cdot i + u_D$$

Only the voltage value $u_D$ contributes to the integration.

If one substitutes the hysteresis loop of the core materials of the integrating reactor 5 in approximation by a magnetization characteristic having two sharp knees, as shown in FIG. 2*a*, then the magnetizing current $i$ during the integrating process can be presumed to be constant and has approximately the value $$i = \frac{H_c \cdot l_F}{w}$$

wherein $H_c$ denotes the coercive force of the core material, $l_F$ the closed iron path of the integrating reactor, and $w$ the number of turns of the reactor winding.

From this, the relative error of the integration follows as:

$$\epsilon = \frac{R \cdot \frac{H_c \cdot l_F}{w}}{U_H}$$

In practice, the counting frequency $f$, generally, is between 0.5 and 50 Hz. (cps.). In this range the coercive force $H_c$ changes at most by the factor 2. However, electronic meters, as well as commercially available watt-hour meters, are usually required to provide for a given minimum operational range, for example 1s100. Consequently $U_H$ may change from $U_H$ min. up to 100 $U_H$ min. This is tantamount to the fact that the maximal error occurs at the minimal Hall voltage. Under these conditions it must be presumed that the coercive force corresponds to that of the static hysteresis loop because the counting frequency is extraordinarily small. The maximal error value therefore results as:

$$\epsilon \text{ max.} \frac{R \cdot H_{co} \cdot l_F}{w \cdot U_H \text{ min.}}$$

This error can be kept small by employing a high-quality material having a low coercive force and a highest feasible $U_H$ min. and hence a high pre-amplification. However the error cannot be fully eliminated in this manner.

FIG. 2*b* shows the typical time curve of the voltage $U_H$ and of the error voltage (shaded area) during a period T in which the magnetization of the reactor core reverses. The corresponding time points $t_1$ to $t_4$ are entered in FIG. 2*a* along the magnetizing characteristic. A compensation of the above-considered error can be brought about by adding to the voltage $U_H$ a compensating voltage $U_V$ of the magnitude $i \cdot R$. This is indicated in FIG. 1 according to which an extraneous direct voltage source is connected through a large series-connected resistor 8 across the resistor 9 in the integrating circuit for passing through resistor 9 an auxiliary current of such a magnitude that the corresponding voltage drop of resistor 9 amounts to the voltage $U_V$.

It is not necessary to vary the voltage $U_V$ in dependence upon the variations of the integrating current *i*. It rather suffices to relate the compensating voltage to the conditions existing at the lowest counting frequency, and hence to the coercive force $H_{co}$ of a static hysteresis loop, maintaining this compensating voltage unchanged for the entire working range of the counter. The compensating voltage then compensates for the error occurring at the lowest voltage $U_H$ min., whereas at higher power values, and consequently at a higher voltage $U_H$, the additional voltage $U_V$ is of lesser or no significance.

FIGS. 3*a* and 3*b* relate to an operation in which the voltage to be integrated is not a direct voltage but an alternating voltage involving the power factor cos $\varphi=1$. FIG. 3*b* covers the magnetization-reversal period T of the integrating reactor, the corresponding time points $t_1$ to $t_9$ being placed along the magnetization characteristic in FIG. 3*a*. In this case, a compensation is obtainable by supplying a direct voltage whose median value corresponds to the area shaded in FIG. 3*b*.

However this method of compensation encounters considerable difficulties if the power factor of the load differs from unity. In this case, the voltage to be integrated assumes positive as well as negative values. This is represented by the explanatory graphs in FIG. 4. Curve *a* of FIG. 4 is the time curve of the utility-line voltage *u* and of the load current *i* at a given phase displacement $\varphi$. From these two input magnitudes the Hall generator produces a Hall voltage proportional to the product of $u \cdot i$. The Hall voltage has a time curve as exemplified in curve *b* of FIG. 4. The error voltage is shown shaded. It changes polarity together with the voltage to be integrated. Assuming that the error voltage is essentially a rectangular wave voltage, the median value is determined by:

$$U_{Fm}=U_K\left(1-\frac{2\varphi}{\pi}\right);\ 0\leqq\varphi\leqq\frac{\Pi}{2}$$

wherein $U_K$ denotes the amplitude of the error voltage apparent from curve *c* of FIG. 4.

The error can be compensated by additionally supplying a direct voltage $U_{Fm}$ to the integrating reactor. This direct voltage would have to be controlled in dependence upon the power factor of the load, which would involve a considerable amount of control equipment.

It is a more specific object of our invention, relating to electronic alternating current metering systems in which a Hall generator receives one of its input magnitudes upon rectification and simultaneously operates as a modulator, to afford a particularly simple solution for the above-mentioned problems.

According to our invention, the compensation of the error voltage is achieved as follows. An adjustable rectangular wave voltage is superimposed upon the Hall-voltage circuit of the Hall generator, this superimposed voltage having the same phase position as the non-rectified input magnitude of the Hall generator. The demodulation effected after amplification of the generator output voltage then produces from the superimposed rectangular wave voltage the required compensating voltage according to the curve *c* of FIG. 4.

For a more accurate consideration of the actual shape of the magnetization characteristic exhibited by the reactor core material, it is of advantage to introduce into the compensating voltage, aside from the term depending upon the phase angle $\varphi$, a constant term which according to another feature of the invention, can be produced by super-imposing upon the Hall-voltage circuit an alternating voltage having the same phase position as the input magnitude to be rectified. It has been found in practice that, for compensating purposes, any square and higher exponential terms need not be taken into account. After demodulation, there results from the superimposed alternating voltage a commutated sine voltage corresponding to curve *d* of FIG. 4.

FIG. 5 shows a circuit diagram of a metering system according to the invention which, as regards various details, is similar to that shown in FIG. 2 of the above-mentioned copending application Ser. No. 320,332. However, the field excitation winding 3 of the Hall generator is not connected to the utility line voltage, but is connected in series in the circuit of the load 2. The control current for the Hall plate of the generator is derived from the utility-line voltage through a rectifier 10 and consequently has the wave shape of a commutated sine voltage The Hall voltage issuing from the two Hall electrodes of the Hall plate 1 is alternating. After merging it with the compensating voltages in the manner still to be described, the resulting output voltages are applied to an alternating voltage amplifier 11 which, in principle, may have any desired design and operation. For example, a transistor amplifier may be used in conjunction with an output transformer. The demodulator stage in this case comprises two secondary windings 12, 13 of this transformer, diodes 14 and two resistors 15 and 16. The secondary winding of a transformer 17 is connected between the midtap between the secondary windings 12, 13 and the midpoint between the resistors 15, 16. The transformer 17 constitutes the output stage of a rectangular wave generator 18 in conventional circuit connection.

The demodulated voltage is supplied to the integrating reactor 19 which is connected in series with an ohmic resistor 20. An appreciable voltage drop occurs at the resistor 20 only after the reactor 19 has reached saturation. At this moment, a flip-flop amplifier 21 is triggered and acts through switching transistors 22 to control a counting mechanism 23, connected to a direct voltage, to advance one counting step.

A phase inverter 24 is connected to the utility-line voltage for the purpose of varying the control voltage by 180° for the square wave oscillator 18. In this manner, the integrating reactor can be caused to integrate alternately into positive and negative saturation respectively. As soon as saturation is reached, the control of the square wave oscillator 18 is changed with the aid of transistor 26 connected in the direct current branch of a diode bridge in series with a resistor 25 at the output of the phase inverter 24. The phase position of the control voltage for the square wave oscillator depends upon whether the transistor 26 is conductive or non-conductive.

According to the invention, an adjustable square wave voltage is merged with the Hall voltage in the Hall-electrode circuit of the Hall plate. This superimposed square wave voltage is furnished from a square wave oscillator 27 of conventional type. The control of the oscillator 27 is effected with the aid of a current transformer 28 connected in the load circuit because, in the present example, the load current constitutes the one input magnitude of the Hall generator that is not to be rectified. The control input leads of the square wave oscillator 27 are connected to the secondary winding of the transformer 28 to which a limiting member 29 is connected in shunt relation. Connected to the secondary winding of the output transformer for the square wave oscillator 27 is a voltage divider composed of two resistors 30 and 31. The resistor 31 is adjustable and is connected in the Hall-voltage circuit.

Also impressed upon the Hall-voltage circuit is an alternating voltage which is derived through a transformer 32 from the line voltage and consequently from the input magnitude of the Hall generator that is to be rectified. The adjustable resistor 34, which together with resistor 33 forms a voltage divider, is connected to the Hall-voltage circuit.

It will be understood that the term "Hall-voltage circuit" comprises the entire current-flow path between the two Hall electrodes of the Hall plate 1 and the integrating saturable reactor 19. It is obvious that the compensating voltages may be superimposed upon this circuit not only ahead of the amplifier, but also within the amplifier or at the output thereof.

The functioning of the compensation according to the invention is evident in conjunction with FIG. 4. The square wave oscillator 27 produces a voltage in phase with the current curve $i$ of curve $a$ of FIG. 4. Also impressed into the Hall-voltage circuit is an alternating voltage which is in phase with the voltage curve $u$ of the curve $a$ of FIG. 4. After the Hall generator forms the product of the magnitudes $i$ and $|u|$, and after the two compensating voltages are merged with the product voltage, and the resultant voltage is amplified and demodulated, the integrating reactor 19 receives compensating voltages corresponding to the curves $c$ and $d$ of FIG. 4. The compensating voltage shown in the curve $c$ of FIG. 4 constitutes a share dependent upon the phase angle, and the voltage shown in the curve $d$ of FIG. 4 is the constant share of the error. Both shares can thus be taken into account and corrected separately from each other.

It is apparent that the compensating method according to the invention is applicable generally for integration with the aid of saturable reactors and hence is not limited to the particular embodiment exemplified in the drawing. In particular, similar features are also applicable in systems where the Hall generator does not operate as a modulator. In contrast with the metering systems previously proposed, including those of the above-mentioned copending application, the compensation, however, is achieved in a particularly simple manner and with a slight amount of circuitry and components, while securing a high degree of accuracy.

We claim:

1. An electronic alternating current power metering system, comprising a Hall generator having two input circuits for respective current and voltage input magnitudes of the alternating current to be metered and having a magnetic field coil in one of said input circuits and a field-exposed Hall plate in the other of said input circuits and a Hall-plate output circuit, rectifier means connected in one of said input circuits to provide one of said input magnitudes in rectified condition as a rectified input magnitude, and integrating reactor connected to said output circuit, indicating means connected to said reactor for operation in acordance with the active power factor of the alternating current, and compensating means for compensating integrating errors due to departure of the power factor of the alternating current to be metered from unity value, said compensating means comprising a voltage source of adjustable square wave voltage and circuit means connecting said source with said voltage Hall-plate output circuit for superimposing the square wave voltage of said voltage source upon said output circuit in phase with the other of said input magnitudes.

2. In an alternating current power metering system according to claim 1, said compensating means comprising adjustable alternating voltage supply means connected with said Hall-plate output circuit for additionally impressing thereupon an alternating voltage having the same phase position as said rectified input magnitude.

3. In an alternating current power metering system according to claim 1, the voltage source of said compensating means comprising a square wave generator connected to the current input circuit of said Hall generator to be synchronized by a load current, said square wave generator having an output member connected in said Hall-plate output circuit, and a transformer connected to the voltage input circuit of said Hall generator and having a secondary winding connected with said Hall-plate output circuit.

No references cited.

WALTER L. CARLSON, *Primary Examiner.*

J. J. MULROONEY, *Assistant Examiner.*